Aug. 18, 1942.  T. A. DICKS  2,293,495
COTTON PICKER
Filed Nov. 28, 1941  3 Sheets-Sheet 3

Inventor
Thomas A. Dicks
By Raymond Wootton
Attorney

Patented Aug. 18, 1942

2,293,495

UNITED STATES PATENT OFFICE 2,293,495

COTTON PICKER

Thomas A. Dicks, Pittsburgh, Pa.

Application November 28, 1941, Serial No. 420,881

9 Claims. (Cl. 56—41)

This invention relates to improvements in methods and machines for picking cotton, and is primarily concerned with the mechanical collection of cotton in a cleaner condition than existing machines have provided heretofore.

Even where cotton is hand picked, the exclusion of foreign matter has always been an important consideration. But where machines have been adopted, although they have greatly expedited the harvest and have proved advantageous in most respects, they have rendered the problem of clean picking even more difficult. Cotton being a row crop, a highly cultivated one, and necessarily gathered under dry conditions, it is to be expected that considerable dust is raised by a picking machine crossing and recrossing the field. And, as would be expected as well, such dust together with any sticks, leaves, or other particles of vegetation will tend to cling to any of the cotton fibres with which they may come in contact. It is these factors which have relegated machine picked cotton to a lower grade than that enjoyed by the same cotton which has been hand picked. Since the price paid to the grower for his product is thus in part dependent upon its cleanliness, it is advantageous that his crop be delivered to the gin in as clean a state as possible, and it is with this object in view that the present invention is proposed.

In accordance with this invention, as cotton is being removed from the plant and conveyed to a receiver carried in or by the picking machine, cleansing air is directed upon it in such a way as to remove at least a portion of any contaminating particles. To assure that this cleansing air will raise no additional dust from the ground, it is preferable that the air be delivered upwardly into the path of the collecting and conveying means. The source of air may be a pressure tank and/or a compressor driven by the power source of the picking machine itself or by a suitable independent source of power.

For purposes of illustration, this invention will be described as applied to a picking machine of the type disclosed by Angus Campbell, exemplified by his patent numbered 853,916, dated May 14, 1907; which is the forerunner of subsequent constructions of the same type, such as those described in the patents to Haring, No. 1,076,573, dated October 21, 1913; Rust et al., No. 2,058,513, dated October 27, 1936; and Berry, No. 2,224,285, dated December 10, 1940; each of which may be characterized as being of the double drum rotary picker-spindle type. Since it is common in such machines that the picker-spindles be arranged in superimposed rows and project through the slotted opposed inner surfaces of the drums in such a manner that the spindle paths are substantially parallel to the ground over which the machine is traveling, it is proposed that the means for directing cleansing air into the paths of these spindles comprise a plurality of upwardly directed nozzles arranged between the adjacent rows of spindles so as to project air at superatmospheric pressures into the paths of the spindles and accordingly upon the cotton which they are collecting and carrying. If desired, the nozzles of certain rows may be arranged in a relatively staggered relationship so as to distribute the cleansing air more uniformly over the entire area between the drums. As a matter of fact, it is proposed that nozzles be arranged to blow not only upon the cotton being collected and in transit, but in some instances even after it has been withdrawn into one or the other of the drums.

A more complete description of one embodiment of the present invention is based upon the accompanying drawings wherein.

Figure 1:
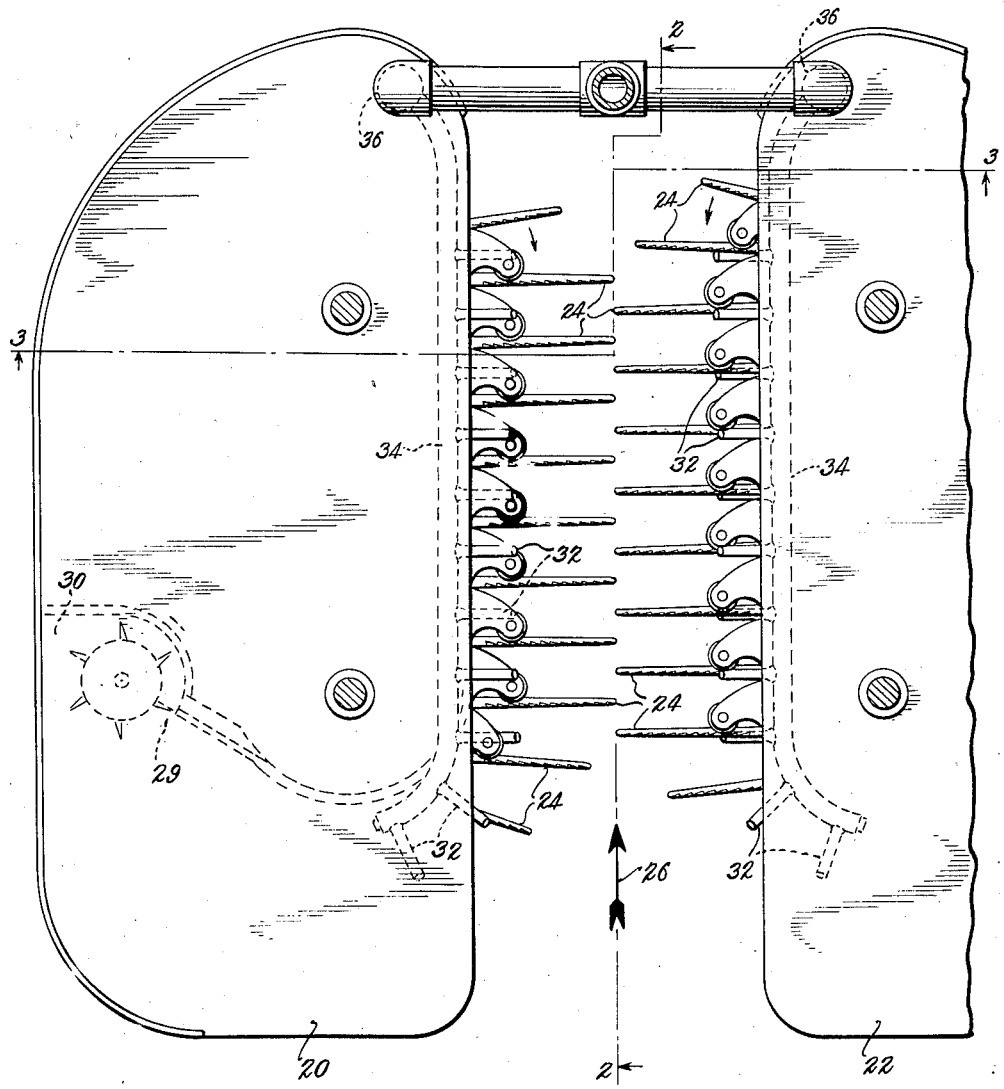
Fig. 1 is a somewhat diagrammatic plan view, partially broken away of the drums of a cotton picking machine embodying the invention.

As previously indicated, the present invention is illustrated in connection with a machine of the type disclosed in the patent to Campbell, No. 853,916, dated May 14, 1907, and Fig. 1 of the present drawings has been based upon Fig. 1 of that patent, omitting certain of those details which are unnecessary for an understanding of the improvement here involved. The drums 20 and 22 forming a part of the machine here under consideration are provided with suitable endless carriers for moving the picker-spindles 24 relative to the drums as the machine progresses in the direction of the arrow 26 towards a cotton plant in its path. After the conveying means in the form of the picker-spindles 24 are projected into the cotton plant and rotated to collect the fibers, they become relatively stationary as regards forward movement with respect to the plant until they begin to recede towards the strippers 29 within the drums. As the machine is approaching the plant and while the cotton is being collected and transferred to a receiver 30 within each drum, a plurality of upwardly directed nozzles 32 project air at superatmospheric pressures upon the cotton and into the paths of the spindles to blow undesirable materials such as dust, twigs, leaves and other foreign matter from the cotton.

Figure 2:
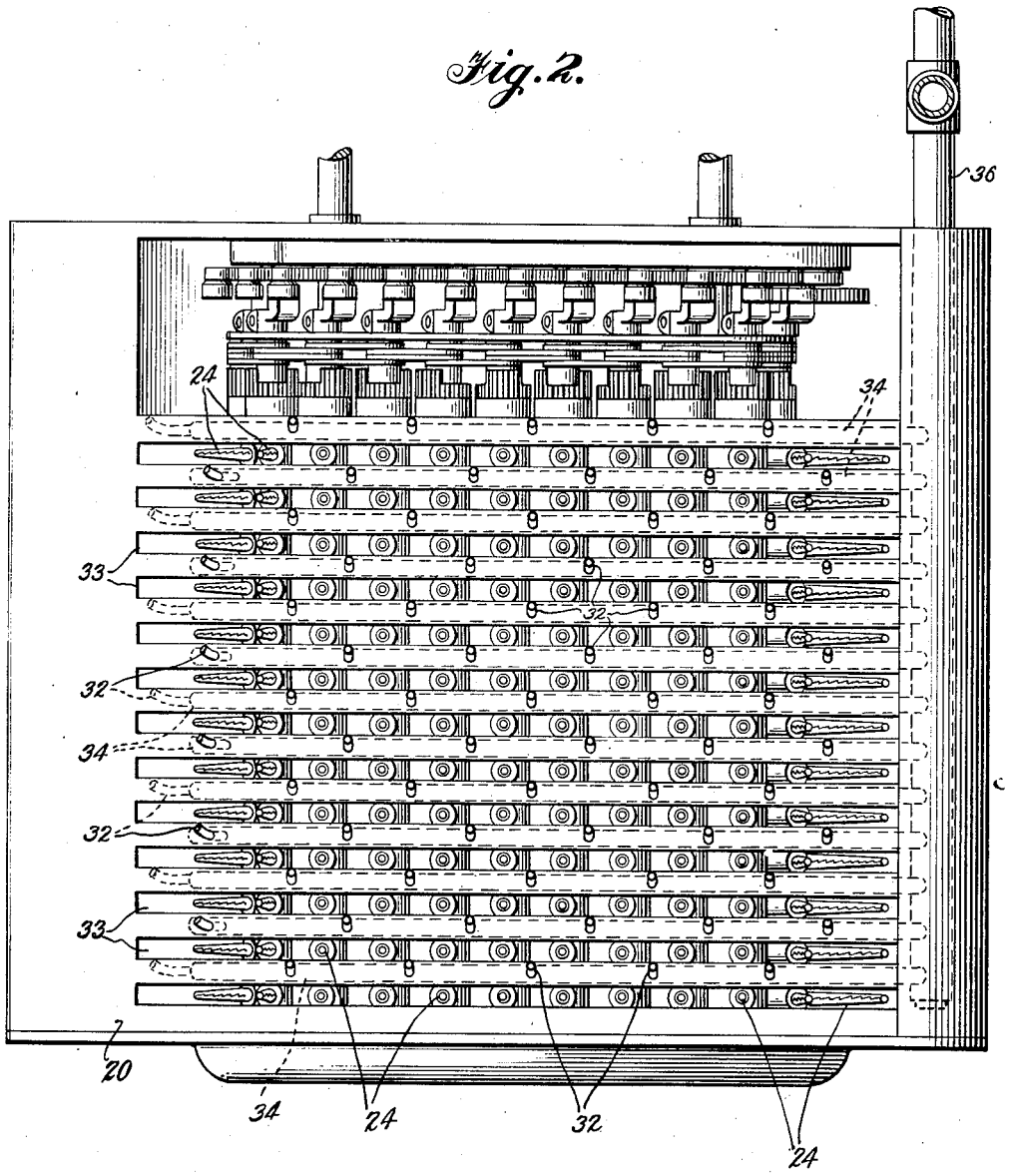
Fig. 2 is an elevation taken along line 2—2 of Fig. 1 showing the inner wall of one of the drums.
Figure 3:
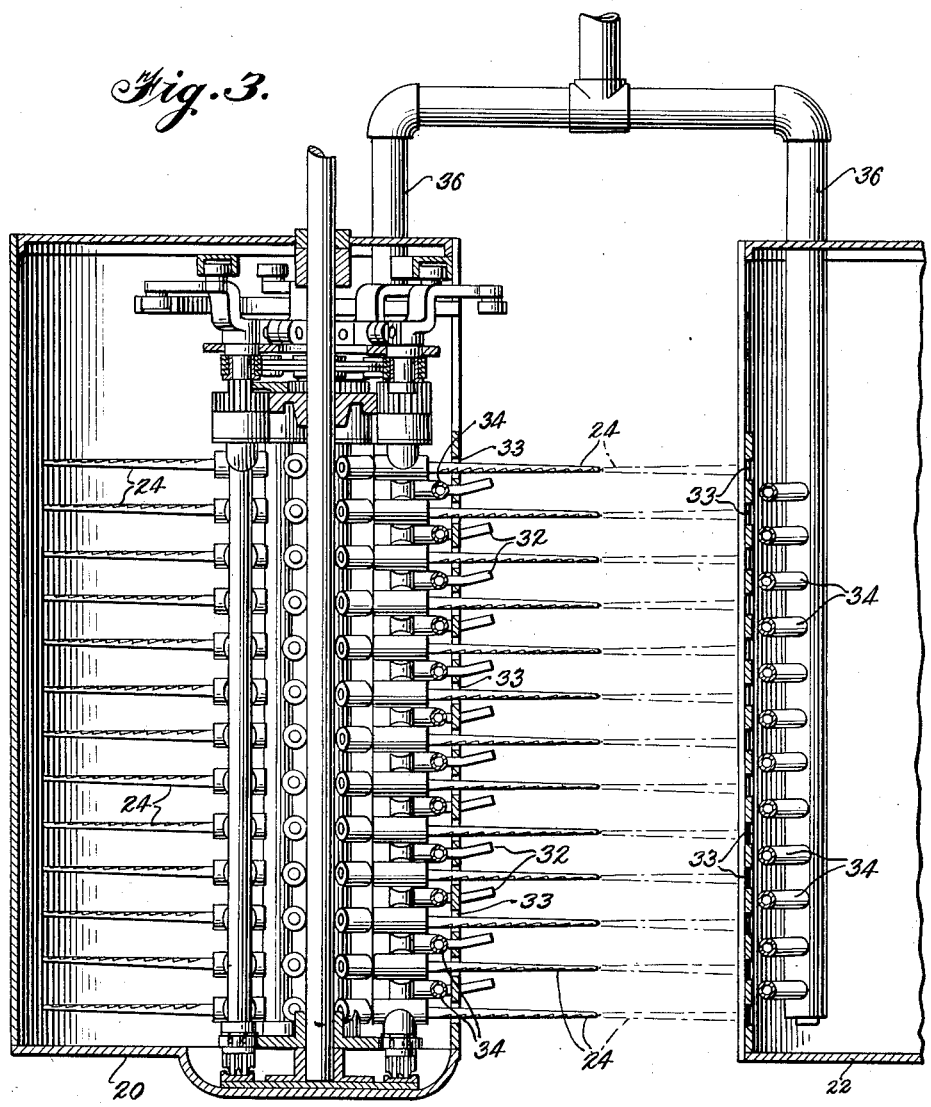
Fig. 3 is a section taken along line 3—3 of Fig. 1.

As clearly depicted in Figs. 2 and 3 of the drawings, the nozzles may be arranged in staggered superimposed rows intermediate the slots 33 defined in the opposed inner surfaces of the drums for passage of the spindles. As shown in the construction illustrated, each row of nozzles is supplied from a main 34 which may be connected in common with the mains feeding the other rows of nozzles in the drum to a header 36 which is in turn connected with a suitable source of air under pressure. The source or sources of air under pressure may be arranged in one or both drums, or the headers 36 may be connected together as illustrated and to a common source (not shown) such as a pump or pressure tank, or they may be separately supplied by individual tanks or pumps. In any case, where the air is compressed during operation of the machine, the driving force may be provided by a suitable power take-off from the machine or by a separate source of power carried by or connected to the machine.

Since the invention is applicable to machines of other types, it is not to be limited to the specific construction illustrated except as called for in the appended claims.

I claim:

1. In a cotton picking machine, a plurality of picking elements, means for moving said elements in a predetermined path including a picking portion during which said elements move longitudinally with respect to the machine as it advances in its picking operation, and means extending along substantially the entire picking portion of the path of said elements for blowing air upon the product being picked to remove foreign matter therefrom.

2. In a cotton picking machine, a plurality of picking elements, means for moving said elements in a predetermined path including a picking portion during which said elements move longitudinally with respect to the machine as it advances in its picking operation, and upwardly directed means extending along substantially the entire picking portion of the path of said elements for blowing air upon the product being picked to remove foreign matter therefrom.

3. In a cotton picking machine, a plurality of picking elements, means for moving said elements in a predetermined path including a picking portion during which said elements move longitudinally with respect to the machine as it advances in its picking operation, and means extending along a substantial part of the picking portion of the path of said elements for blowing air upon the product being picked to remove foreign matter therefrom.

4. In a cotton picking machine, a plurality of picking elements, means for moving said elements in a predetermined path including a picking portion during which said elements move longitudinally with respect to the machine as it advances in its picking operation, and a plurality of nozzles extending along substantially the entire picking portion of the path of said elements for blowing air upon the product being picked to remove foreign matter therefrom.

5. In a cotton picking machine, a plurality of picking elements, means for moving said elements in a predetermined path including a picking portion during which said elements move longitudinally with respect to the machine as it advances in its picking operation, and a plurality of rows of nozzles extending along substantially the entire picking portion of the path of said elements for blowing air upon the product being picked to remove foreign matter therefrom.

6. In a cotton picking machine, a plurality of picking elements, means for moving said elements in a predetermined path including a picking portion during which said elements move longitudinally with respect to the machine as it advances in its picking operation, a plurality of rows of nozzles extending along substantially the entire picking portion of the path of said elements for blowing air upon the product being picked to remove foreign matter therefrom, an air supply pipe for each row of nozzles, and a header for said supply pipes.

7. In a cotton picking machine, a plurality of picking elements, means for moving said elements in a predetermined path including a picking portion during which said elements move longitudinally with respect to the machine as it advances in its picking operation, and a conveying portion during which the elements travel within a drum, and means extending along substantially the entire picking portion of the path of said elements and along a portion of the path within said drum for blowing air upon the product being picked to remove foreign matter therefrom.

8. In a cotton picking machine, a plurality of rows of picker-spindles, means for moving said spindles in a predetermined path including a picking portion during which said spindles move longitudinally with respect to the machine as it advances in its picking operation, and nozzles arranged between said rows extending along substantially the entire picking portion of the path of said spindles for blowing air upwardly upon the product being picked to remove foreign matter therefrom.

9. In a cotton picking machine, a plurality of rows of picking elements, means for moving said elements in a predetermined path including a picking portion during which said elements move longitudinally with respect to the machine as it advances in its picking operation, and staggered rows of nozzles arranged between said rows of elements extending along substantially the entire picking portion of the path of said elements for blowing air upon the product being picked to remove foreign matter therefrom.

THOMAS A. DICKS.

CERTIFICATE OF CORRECTION.

Patent No. 2,293,495.　　　　　　　　　　　　　　　August 18, 1942.

THOMAS A. DICKS.

It is hereby certified that error appears in the printed specification of the above numbered patent requiring correction as follows: Page 2, second column, line 38, claim 7, strike out "of said elements and along a portion of the"; and that the said Letters Patent should be read with this correction therein that the same may conform to the record of the case in the Patent Office.

Signed and sealed this 15th day of September, A. D. 1942.

Henry Van Arsdale,
(Seal)　　　　　　　　　　　　　　　　　　Acting Commissioner of Patents.